(12) United States Patent
Ahn et al.

(10) Patent No.: US 10,193,709 B2
(45) Date of Patent: Jan. 29, 2019

(54) METHOD FOR PROCESSING REQUEST MESSAGES IN WIRELESS COMMUNICATION SYSTEM, AND DEVICE FOR SAME

(71) Applicant: LG ELECTRONICS INC., Seoul (KR)

(72) Inventors: Hongbeom Ahn, Seoul (KR); Seungkyu Park, Seoul (KR); Seongyun Kim, Seoul (KR); Seungmyeong Jeong, Seoul (KR); Dongjoo Kim, Seoul (KR); Heedong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 15/316,766

(22) PCT Filed: Jun. 29, 2015

(86) PCT No.: PCT/KR2015/006633
§ 371 (c)(1),
(2) Date: Dec. 6, 2016

(87) PCT Pub. No.: WO2016/003134
PCT Pub. Date: Jan. 7, 2016

(65) Prior Publication Data
US 2017/0201392 A1     Jul. 13, 2017

Related U.S. Application Data

(60) Provisional application No. 62/018,671, filed on Jun. 30, 2014, provisional application No. 62/173,967, filed on Jun. 11, 2015.

(51) Int. Cl.
*H04L 12/66*     (2006.01)
*H04L 12/24*     (2006.01)
(Continued)

(52) U.S. Cl.
CPC .............. *H04L 12/66* (2013.01); *H04L 41/00* (2013.01); *H04L 67/16* (2013.01); *H04W 4/70* (2018.02)

(58) Field of Classification Search
CPC ......... H04L 12/66; H04L 41/00; H04L 67/16; H04W 4/70
See application file for complete search history.

(56) References Cited

U.S. PATENT DOCUMENTS

2005/0193106 A1     9/2005    Desai et al.

FOREIGN PATENT DOCUMENTS

EP            1713232 A1     10/2006
WO    WO 2011/112683 A1    9/2011
(Continued)

OTHER PUBLICATIONS

Banouar et al., "OM2M: Standardized service platform for M2M interoperability," EclipseCon France 2014, Toulouse, France, Jun. 18-19, 2014, slides 1-17 (19 pages total).
(Continued)

*Primary Examiner* — Omar J Ghowrwal
(74) *Attorney, Agent, or Firm* — Birch, Stewart, Kolasch & Birch, LLP

(57) ABSTRACT

A method for processing request messages between heterogeneous systems in a wireless communication system, the method being performed by a gateway device and possibly comprising the steps of: receiving an advertisement message on the services of a first node from the first node belonging to a first system; in case the advertisement message comprises an indicator that the services are shared with a second system, generating resources corresponding to the shared services and a resource for access control for the resources corresponding to the shared services; receiving a request message for retrieving information on the generated
(Continued)

resources from a second node of the second system; if the second node has an access right to the retrieval, transmitting the information on the generated resources to the second node; receiving, from the second node, a request message for generating a resource, which corresponds to a service to be called selected from the information on the generated resources, as a child resource of the generated resources; and checking an access right for the generation of the child resource.

16 Claims, 12 Drawing Sheets

(51) Int. Cl.
*H04W 4/70* (2018.01)
*H04L 29/08* (2006.01)

(56) References Cited

FOREIGN PATENT DOCUMENTS

| WO | WO 2012/030067 A2 | 3/2012 |
| WO | WO 2013/106188 A2 | 7/2013 |
| WO | WO 2013/184225 A1 | 12/2013 |

OTHER PUBLICATIONS

Oberthur Technologies (Contact: D. Vujcic), "Alignment with the access control terminology," oneM2M Meeting 2014, Berlin, Germany, ARC-2014-1307R01, Mar. 31, 2014, p. 1-6.

METHOD FOR PROCESSING REQUEST MESSAGES IN WIRELESS COMMUNICATION SYSTEM, AND DEVICE FOR SAME

CROSS REFERENCE TO RELATED APPLICATIONS

This application is the National Phase of PCT International Application No. PCT/KR2015/006633, filed on Jun. 29, 2015, which claims priority under 35 U.S.C. 119(e) to U.S. Provisional Application No. 62/018,671, filed on Jun. 30, 2014 and 62/173,967, filed on Jun. 11, 2015, all of which are hereby expressly incorporated by reference into the present application.

TECHNICAL FIELD

The present invention relates to a method for processing request messages in a wireless communication system and a device for the same.

BACKGROUND ART

M2M (Machine-to-Machine) communication technology has come into the spotlight with the advent of ubiquitous computing. M2M communication technology is being studied by many standards development organizations (SDOs) such as TIA, ATIS, ETSI and oneM2M. In M2M environments, communication between M2M related applications (network application/gateway application/device application) is performed and an M2M platform or framework (e.g. common service entity (CSE)) may differ from a network application operating entity.

In addition, for M2M communication efficiency or other purposes or effects, attempts of extension to M2M devices belonging to different M2M systems (i.e., heterogeneous systems) have been made. In regard to this, interworking between different M2M systems has recently been performed.

Accordingly, the present invention proposes a method for interworking between heterogeneous M2M systems. Particularly, the present invention proposes a method for interworking between systems using different application program interface (APIs) styles.

DISCLOSURE

Technical Problem

An object of the present invention devised to solve the problem lies in a method for interworking between heterogeneous systems and, more specifically, a method for processing request messages between heterogeneous systems.

The technical problems solved by the present invention are not limited to the above technical problems and those skilled in the art may understand other technical problems from the following description.

Technical Solution

In an aspect of the present invention, a method for processing request messages between heterogeneous systems in a wireless communication system, the method being performed by a gateway device, includes: receiving an advertisement message about a service of a first node from the first node belonging to a first system; when the advertisement message includes an indicator indicating that the service is shared with a second system, generating resources corresponding to the shared service and a resource for access control for the resources corresponding to the shared service; receiving a request message for retrieving information on the generated resources from a second node of the second system; transmitting the information on the generated resources to the second node when the second node has an access right for the retrieving information on the generated resources; receiving, from the second node, a request message for generating a resource corresponding to a service to be called selected from the information on the generated resources, as a child resource of the generated resources; and checking an access right for generation of the child resource.

Additionally or alternatively, the advertisement message may further include an identifier of a node of the second system sharing the shared service.

Additionally or alternatively, the service may interwork for all nodes of the second system when the advertisement message does not include the identifier of the node of the second system sharing the shared service.

Additionally or alternatively, the method may further include generating the child resource when the second node has an access right for generation of the child resource.

Additionally or alternatively, the method may further include calling the first node for execution of a service corresponding to the child resource when the child resource is generated.

Additionally or alternatively, the method may further include receiving a result of processing of the called service from the first node and updating the result to a specific child resource of the generated resources.

Additionally or alternatively, the method may further include receiving a request for generating a resource for notification of a result of processing of the selected service to be called.

Additionally or alternatively, the first system may use a first interface type and the second system may use a second interface type.

Additionally or alternatively, the first interface type may be a remote procedure call application program interface (RPC API) and the second interface type may be a resource API.

In another aspect of the present invention, an M2M device configured to process request messages in a wireless communication system includes: a radio frequency (RF) unit; and a processor configured to control the RF unit, wherein the processor is configured: to receive an advertisement message about a service of a first node from the first node belonging to a first system; when the advertisement message includes an indicator indicating that the service is shared with a second system, to generate resources corresponding to the shared service and a resource for access control for the resources corresponding to the shared service; to receive a request message for retrieving information on the generated resources from a second node of the second system; to transmit the information on the generated resources to the second node when the second node has an access right for the for retrieving information on the generated resources; to receive, from the second node, a request message for generating a resource corresponding to a service to be called selected from the information on the generated resources, as a child resource of the generated resources; and to check an access right for generation of the child resource.

Additionally or alternatively, the advertisement message may further include an identifier of a node of the second system sharing the shared service.

Additionally or alternatively, the service may interwork for all nodes of the second system when the advertisement message does not include the identifier of the node of the second system sharing the shared service.

Additionally or alternatively, the processor may be configured to generate the child resource when the second node has an access right for generation of the child resource.

Additionally or alternatively, the processor may be configured to call the first node for execution of a service corresponding to the child resource when the child resource is generated.

Additionally or alternatively, the processor may be configured to receive a result of processing of the called service from the first node and to update the result to a specific child resource of the generated resources.

Additionally or alternatively, the processor may be configured to receive a request for generating a resource for notification of a result of processing of the selected service to be called.

Additionally or alternatively, the first system may use a first interface type and the second system may use a second interface type.

Additionally or alternatively, the first interface type may be an RPC API and the second interface type may be a resource API.

The aforementioned technical solutions are merely parts of embodiments of the present invention and various embodiments in which the technical features of the present invention are reflected can be derived and understood by a person skilled in the art on the basis of the following detailed description of the present invention.

Advantageous Effects

According to an embodiment of the present invention, it is possible to process request messages between heterogeneous wireless communication systems smoothly and efficiently.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
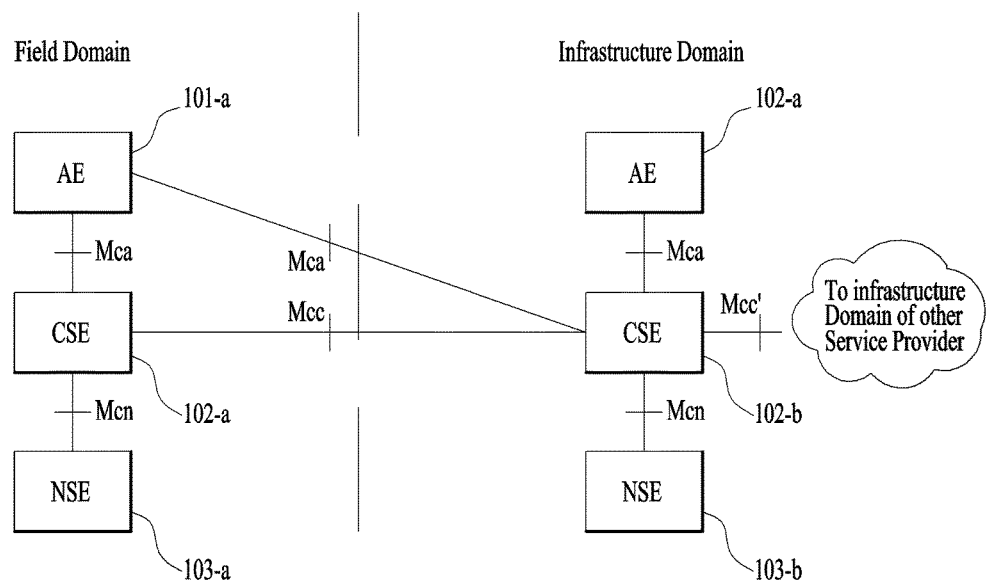
FIG. 1 illustrates a functional architecture of an M2M communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
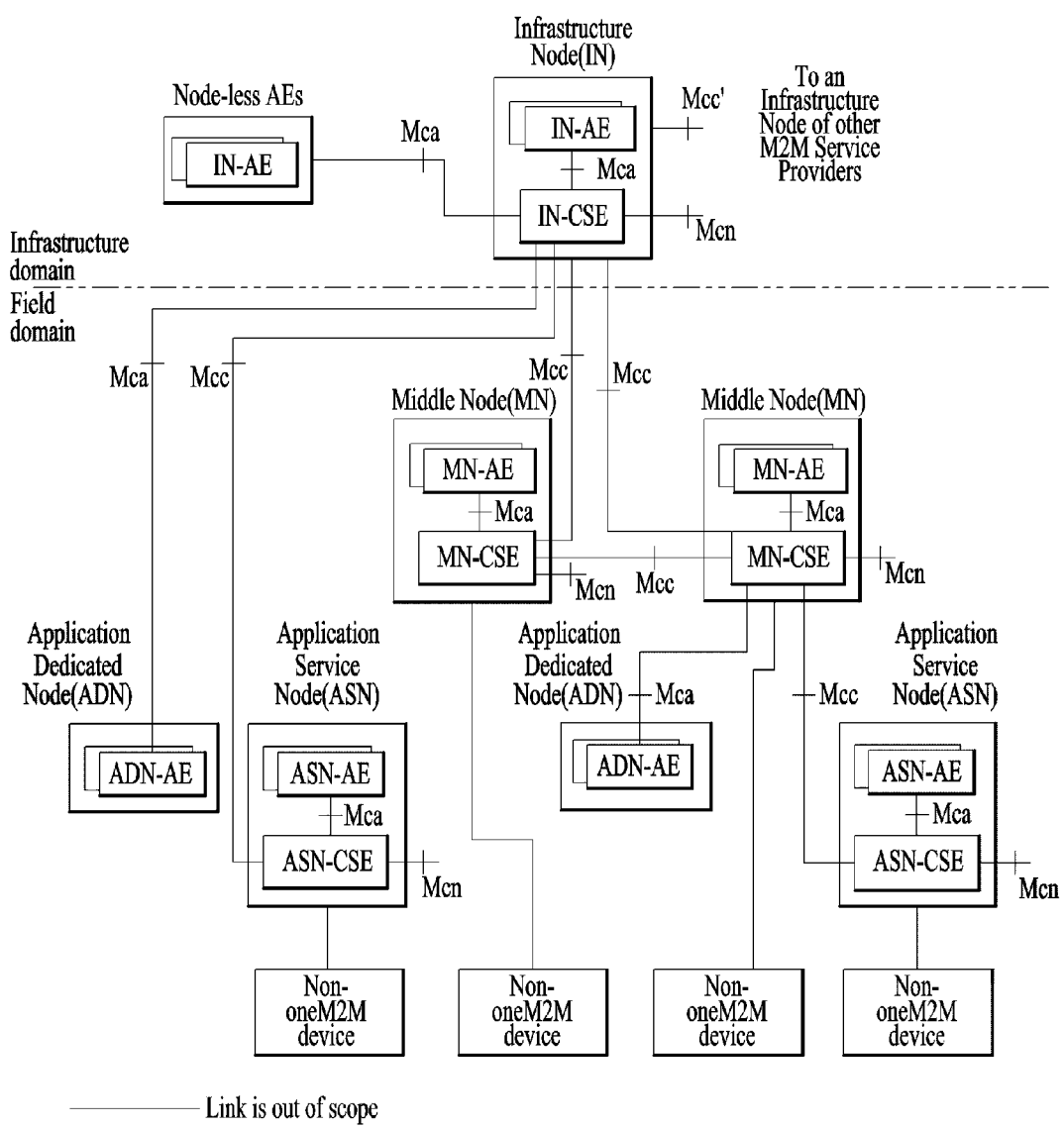
FIG. 2 illustrates an architecture supported by the M2M communication system on the basis of the M2M functional architecture.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:

one or more ASNs;

one or more middle nodes (MNs); and one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:

one or more middle nodes; and/or one or more application service nodes.

The IN may communicate with one or more ADNs over one or more Mca reference points.

Figure 3:
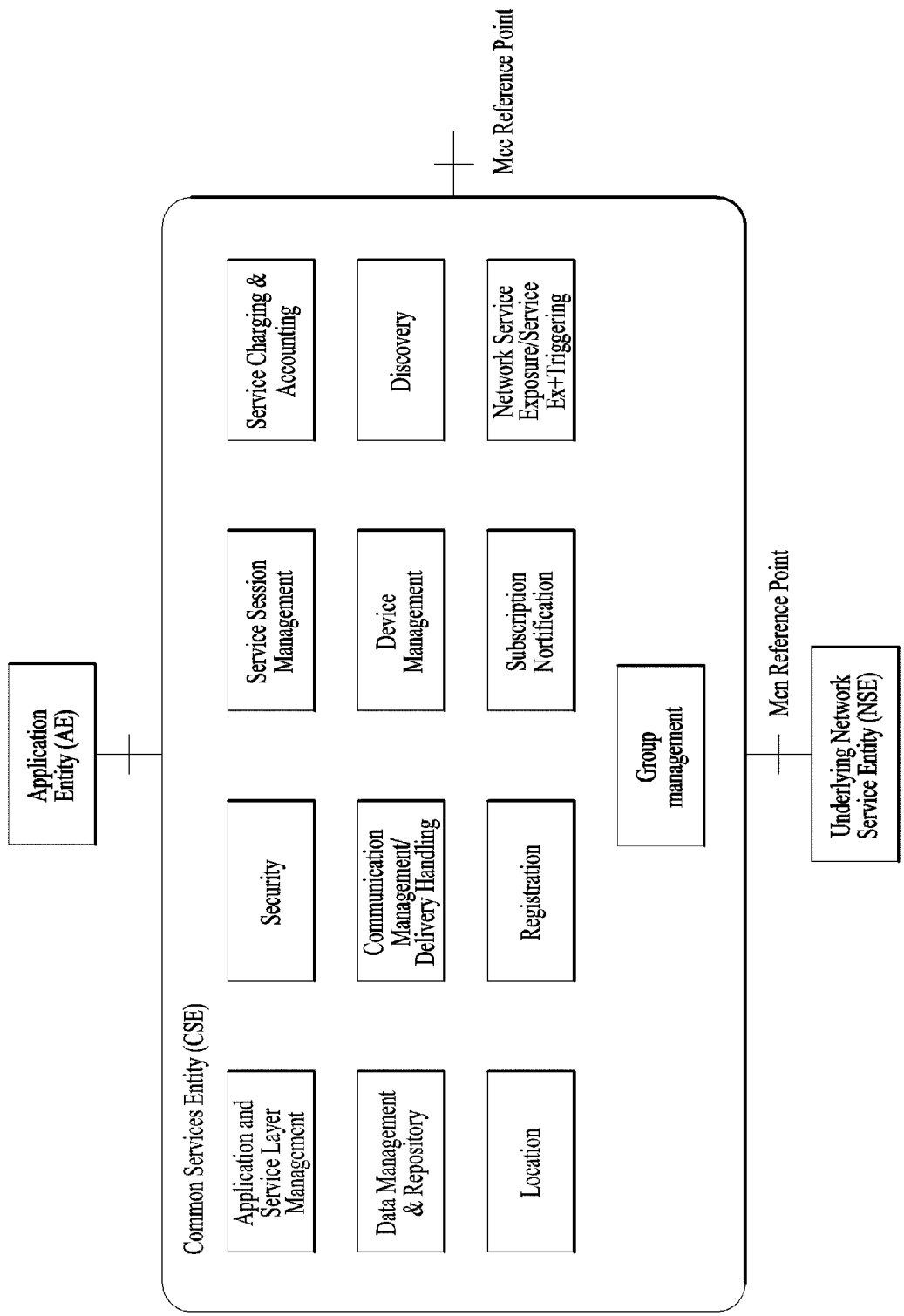
FIG. 3 illustrates a common service function provided by the M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways.

Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

The term "resource" in the M2M communication system may be used to construct and express information in the M2M communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
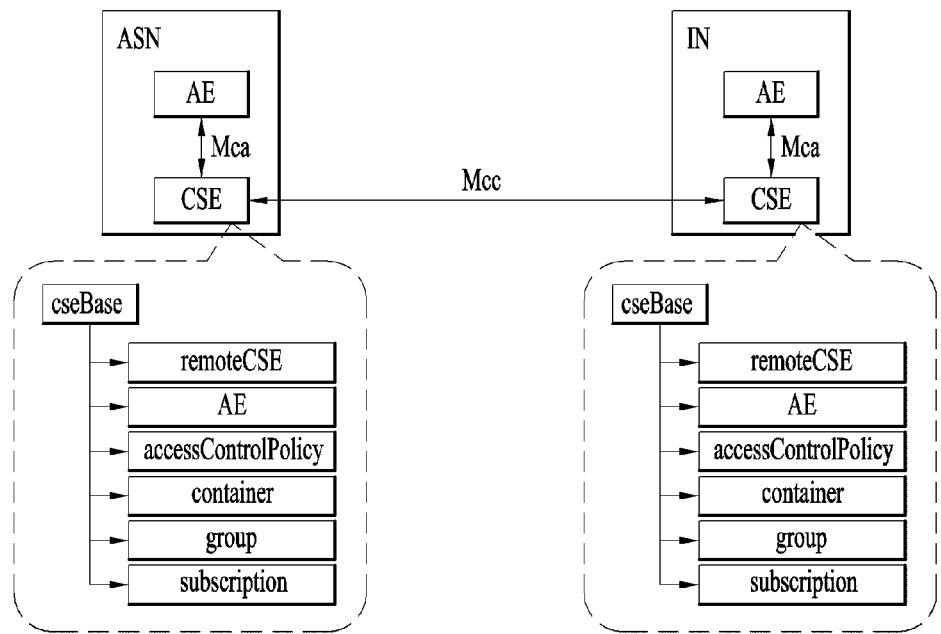
FIG. 4 illustrates resource structures present in an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
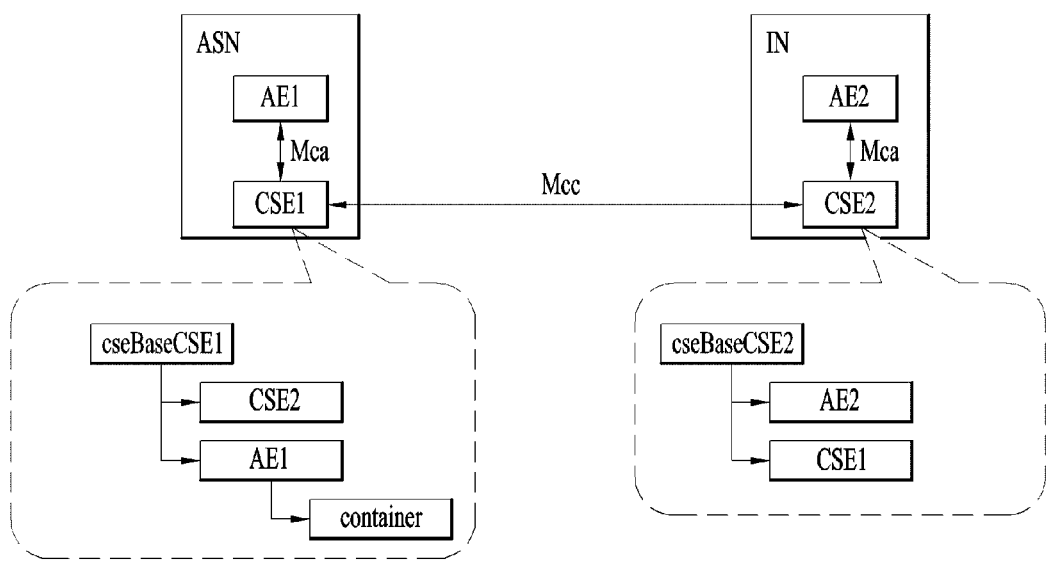
FIG. 5 illustrates resource structures present in an M2M application service node (e.g., M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/ application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

As shown in FIG. 4 or 5, the resource for use in the M2M system may be represented by a tree structure, and the root resource type may be denoted by <CSEBase>. Therefore, the <CSEBase> resource type must be present only when the common service entity (CSE) is present.

Figure 6:
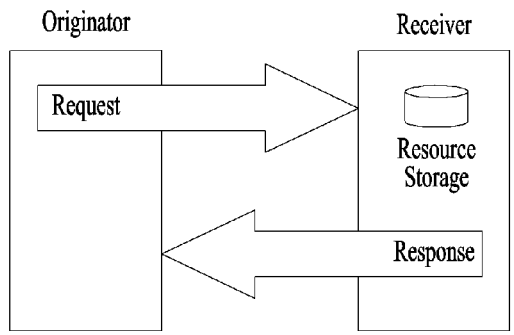
FIG. 6 illustrates a procedure for exchanging a request message and a response message used in an M2M communication system.

FIG. 6 is a conceptual diagram illustrating a general communication flow located at Mca and Mcc reference points. The M2M system operation is carried out on the basis of data exchanging. For example, in order to allow a first device to transmit or perform a command for stopping a specific operation of a second device, the first device must transmit the corresponding command (configured in a data form) to the second device. In the M2M system, data can be exchanged using the request and response messages during communication between the application (or CSE) and another CSE.

The request message may include the following information.

Operation: "Operation" means the shape of an operation to be carried out. (This information may be selected from among Create, Retrieve, Update, Delete, and Notify.)

To: "To" means an ID (i.e., ID of the receiver) of an entity scheduled to receive the request.

From: "From" means an ID of a calling user (i.e., call originator) who generates the request.

Request Identifier: "Request Identifier" means an ID (i.e., ID used to discriminate the request message) of the request message Content: "Content" means content of resources to be transmitted.

The response message may include the following information. If the corresponding request message is successfully processed, the response message may include the following information.

To: "To" means an ID of a calling user (i.e., a call originator) who generates the request message.

From: "From" means an ID of a called person (i.e., a call receiver) who receives the request message.

Request Identifier: "Request Identifier" means an ID of the request message used to identify the ID of the request message.

Result contents: "Result contents" means the processed result (for example, Okay, Okay and Done, Okay and in progress) of the request message.

Content: "Content" means content of resources to be transmitted (only the resultant value (rs) can be transmitted.)

If the request message processing is failed, the response message may include the following information.

To: "To" means an ID of a calling user (i.e., a call originator) who generates the request message.

From: "From" means an ID of a called person (i.e., a call receiver) who receives the request message.

Request Identifier: "Request Identifier" means an ID of the request message (so as to identify the ID of the request message).

rs: "rs" means the processed result (for example, Not Okay) of the request message.

As described above, the response message may include the above-mentioned information.

Meanwhile, various resource types shown in the following table are present.

TABLE 1

| Resource Type | Short Description | Child Resource Types | Parent Resource Types |
|---|---|---|---|
| AE | Stores information about the AE. It is created as a result of successful registration of an AE with the registrar CSE. | subscription, container, group, accessControlPolicy, mgmtObj, commCapabilities, pollingChannel | remoteCSE, CSEBase |
| cmdhNwAccessRule | Defines a rule for the usage of underlying networks. | schedule subscription | cmdhNetworkAccessRules |
| CSEBase | The structural root for all the resources that are residing on a CSE. It shall store information about the CSE itself. | remoteCSE, node, application, container, group, accessControlPolicy, subscription, mgmtObj, mgmtCmd, locationPolicy, statsConfig | None |

TABLE 1-continued

| Resource Type | Short Description | Child Resource Types | Parent Resource Types |
|---|---|---|---|
| group | Stores information about resources of the same type that need to be addressed as a Group. Operations addressed to a Group resource shall be executed in a bulk mode for all members belonging to the Group. | fanOutPoint subscription | Application, remoteCSE, CSEBase |
| locationPolicy | Includes information to obtain and manage geographical location. It is only referred from container, the contentInstances of the container provides location information. | subscription | CSEBase |
| remoteCSE | Represents a remote CSE for which there has been a registration procedure with the registrar CSE identified by the CSEBase resource. | application, container, group, accessControlPolicy, subscription, mgmtObj, pollingChannel, node | CSEBase |
| subscription | Subscription resource represents the subscription information related to a resource. Such a resource shall be a child resource for the subscribe-to resource. | schedule | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| container | Shares data instances among entities. Used as a mediator that takes care of buffering the data to exchange "data" between AEs and/or CSEs. | container, contentInstance, subscription | application, container, remoteCSE, CSEBase |
| contentInstance | Represents a data instance in the container resource. | subscription | container |

Each resource type may be located below the parent resource type of the corresponding resource type, and may have a child resource type. In addition, each resource type may have attributes, and actual values may be stored in the attributes.

Table 2 shows attributes of the <container> resource type. The attributes used to store the actual values may always be set to the value of 1 through multiplicity or may be selectively set to the values ('0 . . . 1') through multiplicity. In addition, the corresponding attributes may be established according to RO (Read Only), RW (Read and Write), WO (Write Only) according to characteristics generated when the corresponding attributes are generated.

TABLE 2

| Attributes of <container> | Multiplicity | RW/RO/WO | Description |
|---|---|---|---|
| resourceType | 1 | RO | Resource Type. This Write Once (at creation time then cannot be changed) resourceType attribute identifies the type of resources. Each resource shall have a resourceType attribute. |
| resourceID | 1 | RO | This attribute is an identifier for resource that is used for 'non-hierarchical URI method' or 'IDs based method' cases. This attribute shall be provided by the Hosting CSE |

TABLE 2-continued

| Attributes of <container> | Multiplicity | RW/RO/WO | Description |
|---|---|---|---|
| | | | when it accepts a resource creation procedure. The Hosting CSE shall assign a resourceID which is unique in the CSE. |
| parentID | 1 | RO | The system shall assign the value to this attribute according to the parameters given in the CREATE Request. It establishes the parent-child relationship by identification of the parent of this child resource. Such identifier shall use the non-hierarchical URI representation. For example, an AE resource with the identifier "myAE41" which has been created under the resource ". . .//example.com/oneM2M/myCSE", the value of the parentID attribute will contain ". . .//parentID". |
| expirationTime | 1 | RW | Time/date after which the resource will be deleted by the hosting CSE. This attribute can be provided by the Originator, and in such a case it will be regarded as a hint to the hosting CSE on the lifetime of the resource. The hosting CSE can however decide on the real expirationTime. If the hosting CSE decides to change the expirationTime attribute value, this is communicated back to the Originator. The lifetime of the resource can be extended by providing a new value for this attribute in an UPDATE operation. Or by deleting the attribute value, e.g. by not providing the attribute when doing a full UPDATE, in which case the hosting CSE can decide on a new value. This attribute shall be mandatory. If the Originator does not provide a value in the CREATE operation the system shall assign an appropriate value depending on its local policies and/or M2M service subscription agreements. |
| accessControlPolicyIDs | 0 . . . 1 (L) | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). |
| labels | 0 . . . 1 | WR | Tokens used as keys for discovering resources. This attribute is optional and if not present it means that the resource cannot be found |

TABLE 2-continued

| Attributes of <container> | Multiplicity | RW/RO/WO | Description |
|---|---|---|---|
| | | | by means of discovery procedure which uses labels as key parameter of the discovery. |
| creationTime | 1 | RO | Time/date of creation of the resource. This attribute is mandatory for all resources and the value is assigned by the system at the time when the resource is locally created. Such an attribute cannot be changed. |
| creator | 0 . . . 1 | RO | The AE-ID or CSE-ID of the entity which created the resource. |
| lastModifiedTime | 1 | RO | Last modification time/date of the resource. This attribute shall be mandatory and its value is assigned automatically by the system each time that the addressed target resource is modified by means of the UPDATE operation. |
| stateTag | 1 | RO | An incremental counter of modification on the resource. When a resource is created, this counter is set to 0, and it will be incremented on every modification of the resource. The stateTag attribute of the parent resource should be incremented first and copied into this stateTag attribute when a new instance is added to the parent resource. |
| announceTo | 0 . . . 1 | RW | This attribute may be included in a CREATE or UPDATE Request in which case it contains a list of URIs/CSE-IDs which the resource being created/updated shall be announced to. This attribute shall only be present on the original resource if it has been successfully announced to other CSEs. This attribute maintains the list of URIs to the successfully announced resources. Updates on this attribute will trigger new resource announcement or de-announcement. |
| announcedAttribute | 0 . . . 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed.) |
| maxNrOfInstances | 0 . . . 1 | RW | Maximum number of instances of <contentInstance> child resources. |

TABLE 2-continued

| Attributes of <container> | Multiplicity | RW/RO/WO | Description |
|---|---|---|---|
| maxByteSize | 0 ... 1 | RW | Maximum number of bytes that are allocated for a <container> resource for all instances in the <container> resource. |
| maxInstanceAge | 0 ... 1 | RW | Maximum age of the instances of <contentInstance> resources within the <container>. The value is expressed in seconds. |
| currentNrOfInstances | 1 | RO | Current number of instances in a <container> resource. It is limited by the maxNrOfInstances. |
| currentByteSize | 1 | RO | Current size in bytes of data stored in a <container> resource. It is limited by the maxNrOfBytes. |
| latest | 0 ... 1 | RO | Reference to latest <contentInstance> resource, when present. |
| locationID | 0 ... 1 | RW | URI of the resource where the attributes/policies that define how location information are obtained and managed. This attribute is defined only when the <container> resource is used for containing location information. |
| ontologyRef | 0 ... 1 | RW | A URI of the ontology used to represent the information that is managed and understood by the AE. The ontology refers to a specification in which terms and relationship therebetween used in a domain to be handled. |

Entity Registration

An M2M entity finishes preparation for using systems/services by registering with neighboring entities irrespective of whether the M2M entity is located in the field domain or infrastructure domain. Such registration is performed at the request of a registree and information on the registree is stored in a registrar as a registration result.

After registration, oneM2M entities can use M2M services using common functions provided by a CSE, as illustrated in FIG. 3.

oneM2M entities include an AE and a CSE and thus registration may be divided into AE registration and CSE registration. Here, both the AE and CSE refer to registrees and the CSE corresponds to a registrar. In the case of CSE registration, information on the registrar CSE is additionally stored in the registree CSE.

Figure 7:
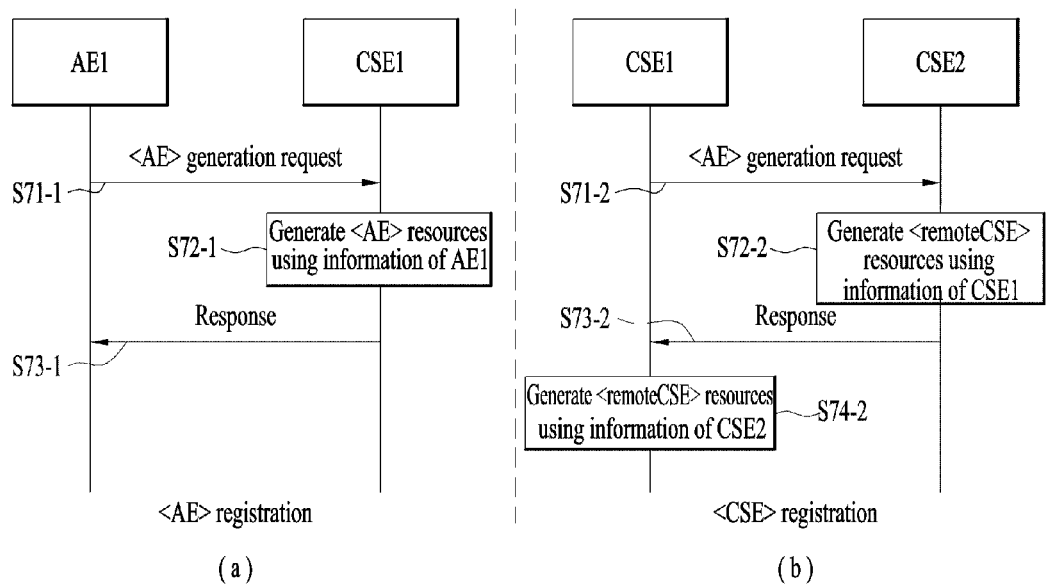
FIG. 7 illustrates a registration procedure in an M2M communication system.

FIG. 7 illustrates an AE registration procedure and a CSE registration procedure. FIG. 7(a) shows the AE registration procedure. AE1 that intends to perform registration sends a request for generation of <AE> resources to CSE1 corresponding to a registrar (S71-1). CSE1 can generate the <AE> resources using information of AE1 (S72-2). Then, CSE1 can send a response including a result of registration to AE1 (S73-2).

FIG. 7(b) illustrates the CSE registration procedure. The procedure of FIG. 7(b) corresponds to the procedure of FIG. 7(a) except that CSE1 corresponds to a registree, CSE2 corresponds to a registrar, and when CSE2 sends a result for a registration request of CSE1 (S73-2), CSE1 generates <remoteCSE> resources using information of CSE2 (S74-2).

M2M Service Interface

The concept of "service" technically refers to software functions for executing business tasks such as accessing files in a system or general functions such as login and authority check. In addition, how to interface services is important. Two technologies (oneM2M and AllJoyn) described in the specification are connected through different interfaces. Although the two technologies are described in the specification, the subject matter of the specification is not limited to the two technologies and is applicable to heterogeneous systems or technologies.

Application Program Interface (API) Through Web

A service interface technology adopted by a oneM2M system is a resource API provided through the web. Basically, a resource has the same meaning as the aforementioned "resource". The resource defines all resources in the form of URI and refers to calling services on the basis of a standard technology used on the web, such as HTTP/CoAP.

Figure 8:
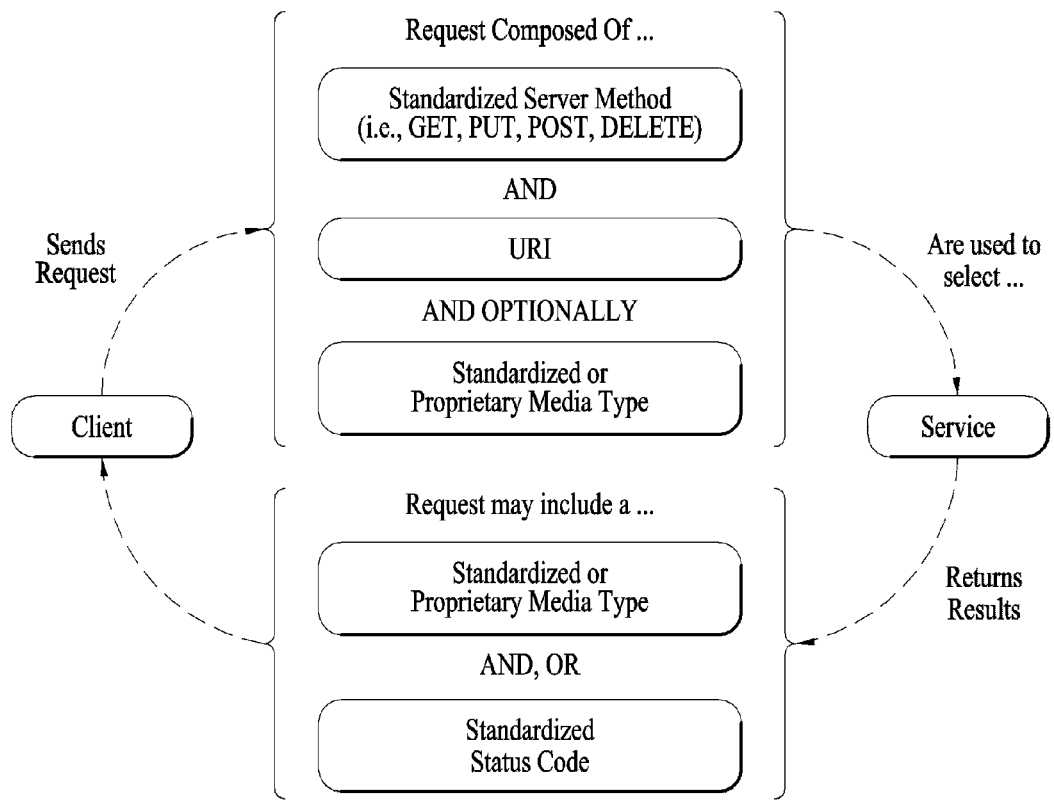
FIG. 8 illustrates an operation related to a source API.

FIG. 8 illustrates an operation related to a resource API. In a resource connected service interface system, a client (requester) can send a request for a desired service by adding a media type (e.g., XML or JSON) message to a URI that a server has and the client intends to call and then adding one of HTTP operations (GET, PUT, POST, DELETE, etc.) thereto. Upon reception of the request, the server can respond to the request by calling the service, converting results for the request into a media type that can be recognized by the client and including an execution status code in the media type.

The resource API has the advantage that a service interface can be implemented at low cost since services are called and replies are sent using the HTTP protocol and standardized media types widely used on the web and additionally the advantage of having power of influence like the web because all resources have unique URIs on the web, and thus the resource API is recently used as an M2M service platform base technology.

Remote Procedure Call (RPC) API

RPC is an intuitive method for calling a service present outside a requester in distributed processing environments. This is a service interface technology adopted by the AllJoyn system.

Figure 9:
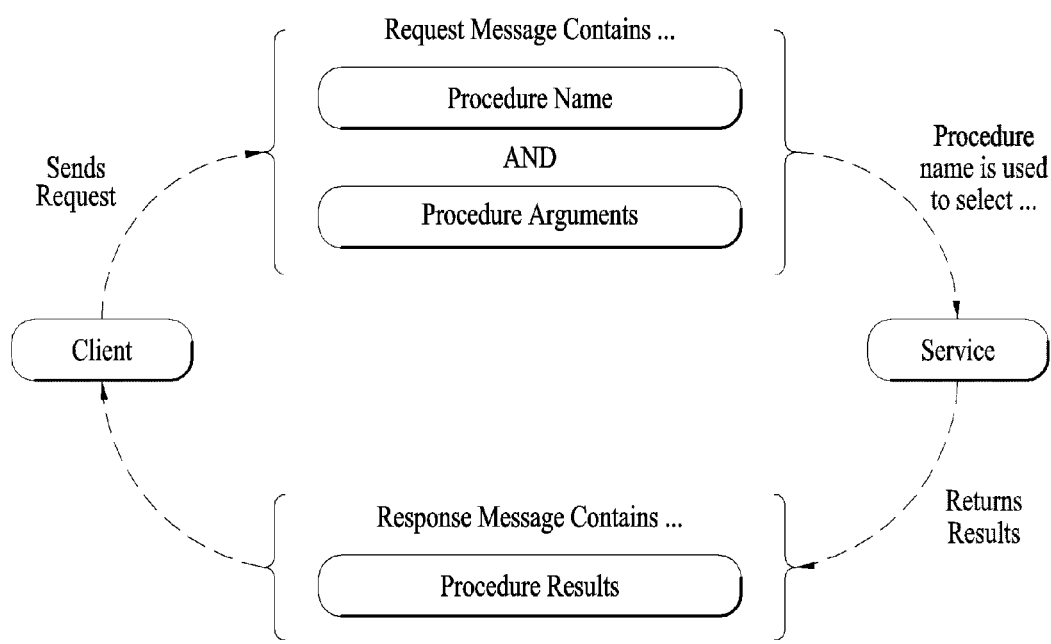
FIG. 9 illustrates an operation related to an RPC API.

FIG. 9 illustrates an operation related to an RPC API. To use a service provided by a server, a client can include a function name and function arguments in a request message and send the message to call the service (i.e., function), like an operation of calling a necessary function from among functions defined for the service. The server that implements the service can provide results obtained by operating the requested service to the requester (client).

The RPC API has characteristics that the form of a specific call message is not standardized differently from the resource API. When the same protocol message is used in the system, system operation can be performed on the basis of the protocol message.

Configuration of AllJoyn System

AllJoyn is a system for providing M2M services to terminals having different capabilities through provision of connectivity between distributed M2M applications. A description will be given of functions provided by the AllJoyn system or framework for connectivity.

Figure 10:
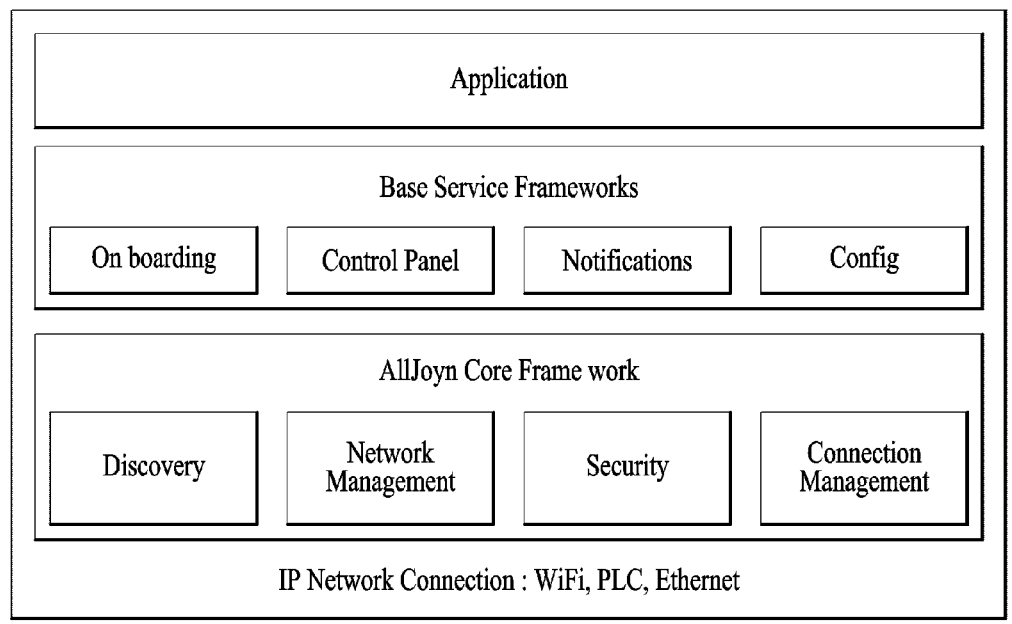
FIG. 10 illustrates a configuration of an AllJoyn framework.

FIG. 10 illustrates a configuration of the AllJoyn framework.

The AllJoyn system provides "Base Service Frameworks" and "AllJoyn core Framework" from among parts shown in FIG. 10. Specifically, the AllJoyn core framework specifies main functions provided by the system and the base service frameworks higher than the AllJoyn core framework may be considered to provide minimized functions of an essential M2M application that is commonly needed in M2M applications on the basis of the lower AllJoyn core framework. Based on the content described in oneM2M, services provided by the system can be regarded as the same as the services provided by the AllJoyn core framework and a set of functions that can be used by the M2M applications, which is obtained by combining parts of the services, can be regarded as the base service frameworks.

AllJoyn core frameworks provided by the AllJoyn system are as follows.

Figure 11:
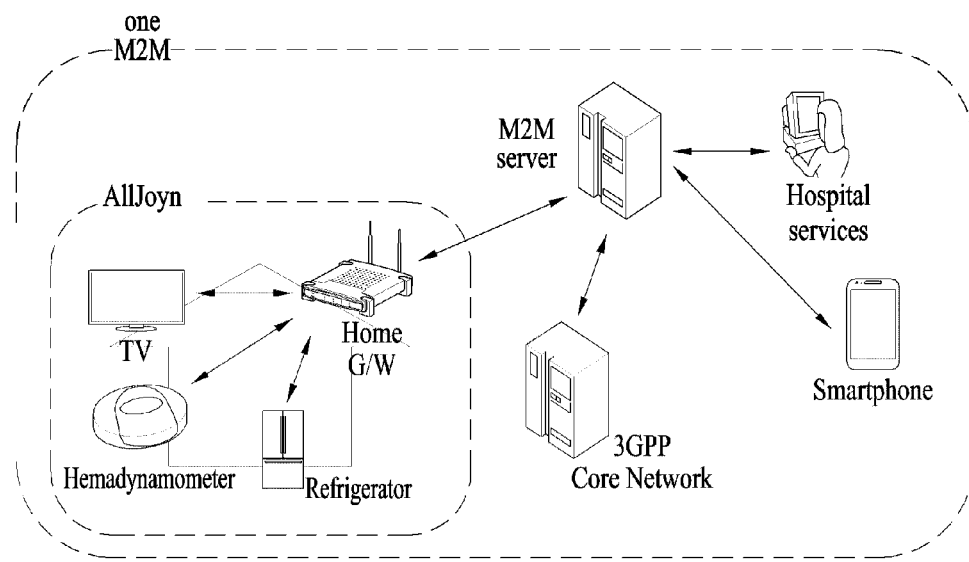
FIG. 11 illustrates a difference between heterogeneous systems according to service coverage.

1. Service Advertisement and Discovery: a function of advertising M2M application functions of an apparatus in which the AllJoyn framework is installed to other apparatuses and a function of recognizing the advertisement and supporting M2M application interface 2 Network Management: functions of managing interworking with various access networks and supporting automatic interworking with a required network through interworking with Wi-Fi or Bluetooth 3. Security: functions of connecting M2M applications connected to the framework and supporting authentication and security for message transmission 4. Connection Management: a function of supporting session management for connection between M2M applications connected to the framework While the AllJoyn system and oneM2M system have similar configurations and purposes, there is a difference between the two systems. FIG. 11 illustrates a difference between the two systems according to service coverage. In general, the service area of the AllJoyn system using Wi-Fi and Bluetooth as an access network is limited to an area that can be covered by the access network. Accordingly, services provided by a terminal in which the AllJoyn framework is installed are preferentially advertised and another terminal is connected to the terminal by discovering the services. Here, the advertisement function is performed by delivering a broadcast or multicast message within the area that can be covered by Wi-Fi and Bluetooth, and thus the service area must be included in the coverage area of the access network. If the service area deviates from the coverage area of the access network, the broadcast or multicast message flows to the Internet backbone network and may damage the Internet backbone network. Consequently, the AllJoyn system adopts active advertisement/discovery, which provides advantages in service pairing.

The service advertisement and discovery scheme of the oneM2M system differs from that of the AllJoyn system. Basically, the oneM2M system uses a method of discovering resources on the web. That is, the oneM2M system simply supports only the operation of discovering resources without advertising resource information using the protocol technology (broadcast) of the access network as in the AllJoyn system. This is because network load is generated when a specific service is advertised using broadcasting in a network having a broad area structure, as described above.

In terms of services, to control a home hemadynamometer, a hospital service system manager illustrated in FIG. 11 needs to use a oneM2M system based protocol for a hospital service, an M2M server and a home gateway (G/W) and to use an AllJoyn system based protocol for the home G/W and the hemadynamometer. Accordingly, the home G/W needs to be able to convert the protocols, that is, messages for compatibility between the AllJoyn system and the oneM2M system.

Figure 12:
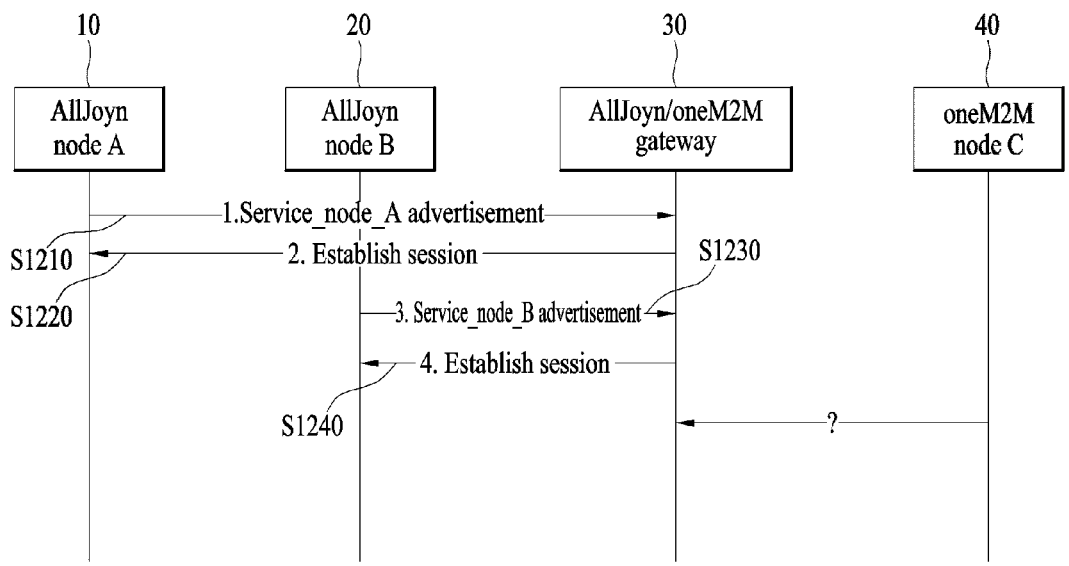
FIG. 12 illustrates problems caused by structures and information inconsistency according to interworking of an AllJoyn system and a oneM2M system.

FIG. 12 illustrates problems caused by structures and information inconsistency according to interworking of the AllJoyn system and oneM2M system.

The oneM2M system, which adopts different service interface structures, more specifically, the resource API, uses resources for service interface between devices. However, the AllJoyn system adopting the RPC API uses the aforementioned remote function call for service interface between devices. Consequently, a oneM2M node C 40 illustrated in FIG. 12, which is a oneM2M-enabled device, transmits a message to a gateway 30 through the protocol defined in oneM2M. For example, the oneM2M node C 40 can retrieve information stored in a certain resource or create specific information in a certain resource. However, an AllJoyn node A 10 and an AllJoyn node B 20 use a protocol that directly calls remotely present functions and thus cannot interwork with a system using a resource as a medium.

Although the gateway supporting both AllJoyn and oneM2M is connected to all services provided by the AllJoyn A and AllJoyn B in FIG. 12, the oneM2M node C cannot be aware of services that are present in the AllJoyn network, resources that can be used and how to exchange information due to an API difference.

The aforementioned oneM2M system and AllJoyn system are exemplary and the above description can be applied to other systems respectively using the resource API and RPC API. Furthermore, embodiments of the present invention, which will be described below, can also be applied to systems using the resource API and RPC API.

Figure 13:
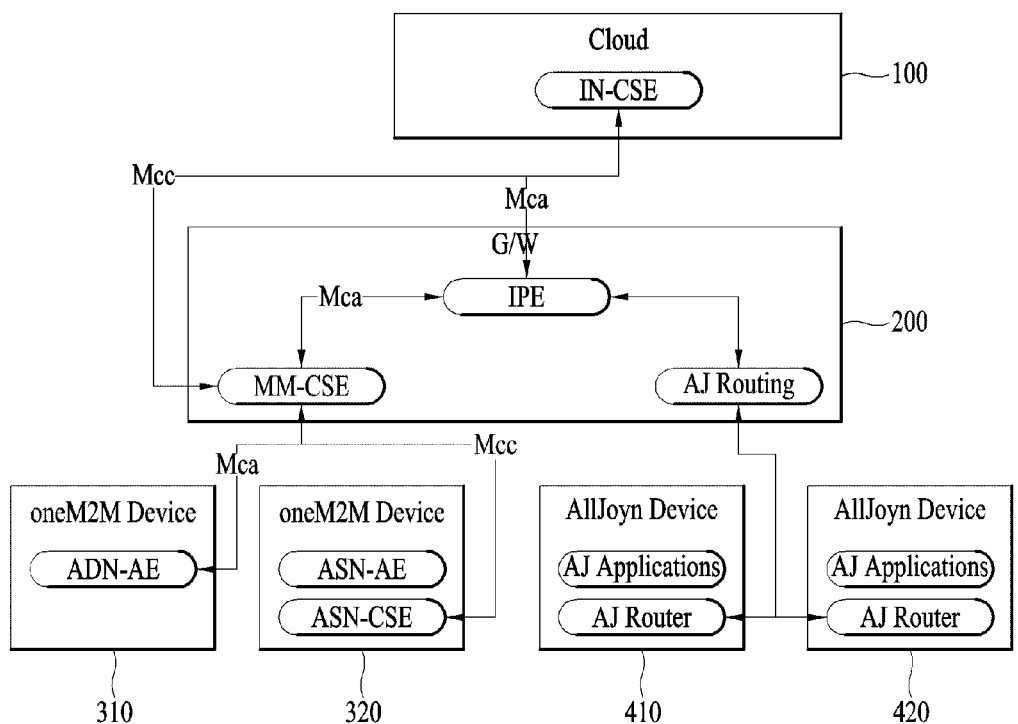
FIG. 13 illustrates a connecting structure of heterogeneous systems according to an embodiment of the present invention.

FIG. 13 illustrates interoperation of heterogeneous systems according to an embodiment of the present invention.

Referring to FIG. 13, a gateway 200 is in charge of interoperation of two heterogeneous systems (oneM2M and AllJoyn). That is, the gateway 200 may include an entity (MN-CSE) that provides the resource API, an entity (AJ routing node) that provides the RPC API and an interworking proxy entity (IPE) that provides a function of interworking and translating the entity providing the resource API and the entity providing the RPC API.

The MN-CSE represents instantiation of a set of common service functions of M2M environments and such service functions are exposed to other entities through Mca and Mcc reference points. The AJ routing node provides AllJoyn framework core functions including P2P advertisement/ discovery, access configuration, broadcast signaling and control/data message routing. The IPE needs to be connected to the MN-CSE and the AJ routing node in order to expose the AllJoyn service to entities that support oneM2M and to expose the oneM2M service to entities that support AllJoyn.

Figure 14:
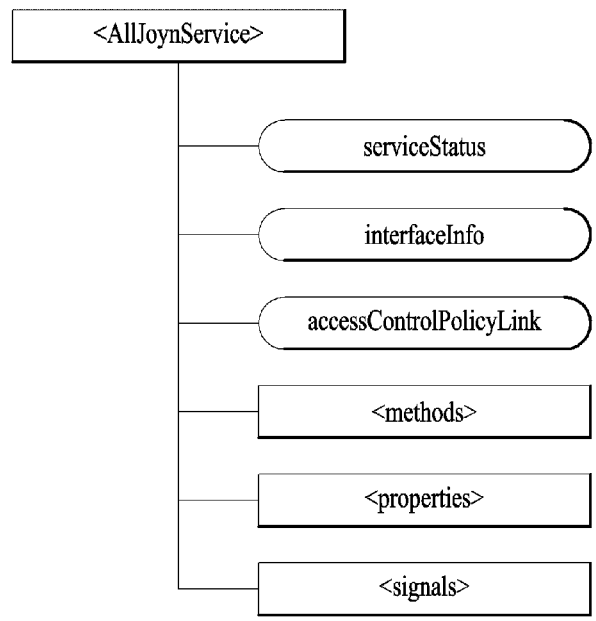
FIG. 14 illustrates a resource structure according to an embodiment of the present invention.

To expose the AllJoyn service of the IPE to entities supporting oneM2M, a resource structure representing the AllJoyn service is proposed. This resource structure is illustrated in FIG. 14.

TABLE 3

| Attribute | Attribute information |
|---|---|
| serviceStatus | Service status information (service operation okay, pending, tear down, etc.) |
| interfaceInfo | The following information is included. Methods |
| | Methods refer to functions provided by the corresponding service. When a parameter is included in a corresponding method and called, the service performs an operation specified by the corresponding function. Properties |
| | Properties refer to data representing or necessary for a corresponding service. Properties are a concept corresponding to attributes in object-oriented programming. Signals |
| | Signals refer to signaling a change of a specific value or status in a corresponding service. However, all methods/properties/signals recorded in interfaceInfo are not exposed to oneM2M because exposure of all methods/ properties/signals may cause system security problems or other additional problems. |
| accessControlPolicyLink | This provides access right information about an object that can use corresponding resources. |

In addition, the resource structure can have the following child resources.

TABLE 4

| Child resource | Child resource information |
|---|---|
| <methods> | This describes a function provided by the AllJoyn service. This has each <method> resource as a lower resource. Function parameters are specified in attribute information of <method> resource. When <method> resource is generated, a method of AllJoyn, which corresponds to the <method> resource, is called. |
| <properties> | This describes data described through the AllJoyn service. When the corresponding value is generated and set by a oneM2M node, the corresponding data value is delivered |

TABLE 4-continued

| Child resource | Child resource information |
|---|---|
| | to the AllJoyn service. When the corresponding value is changed by an AllJoyn service node, an MN-AE determines the change of the value and generates the value in the corresponding resource. Information about properties is registered in attributes of the corresponding resource. |
| <signals> | This describes service signaling by the AllJoyn service. |

A description will be given of operations proposed in the specification with reference to the attached drawings.

Figure 15:
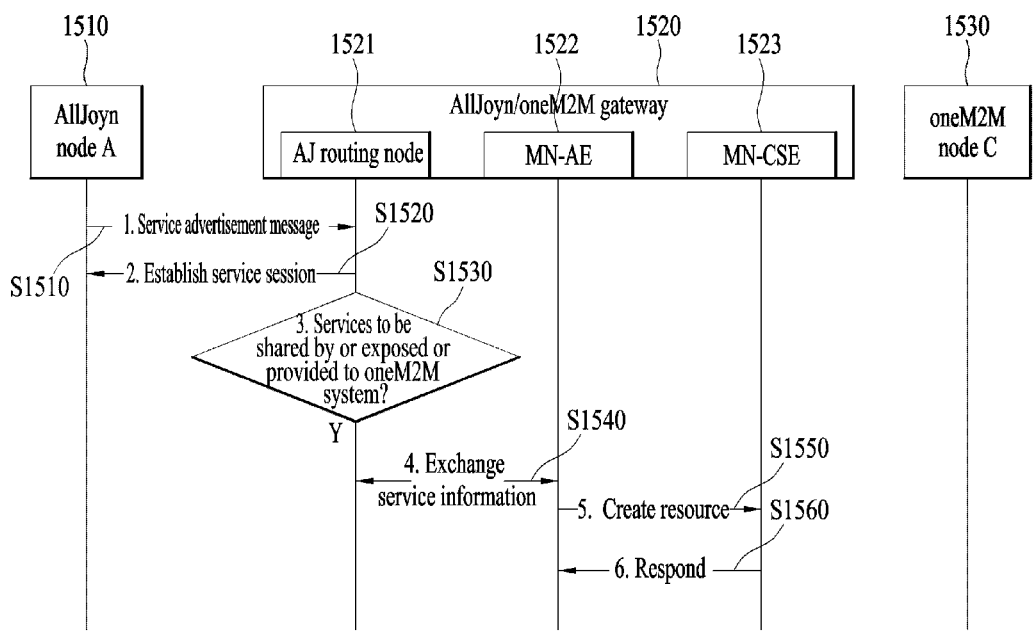
FIGS. 15 and 16 illustrate a procedure according to an embodiment of the present invention.

FIG. 15 illustrates a procedure in which an RPC API based node (e.g., AllJoyn node) advertises a service thereof and a gateway supporting both the RPC API and the resource API (e.g., oneM2M) generates a resource for the service of the RPC API based node. In this way, the gateway generates the resource such that the resource API based node (e.g., oneM2M node) can discover the service of the RPC API based node.

An AllJoyn node A 1510 may transmit an advertisement message about a service that can be provided thereby to a gateway 1520 or an AJ routing node 1521 of the gateway (S1510). The advertisement message may include a) an indicator indicating whether the service is shared by, exposed to or provided to the resource API based network or entities and/or b) an identifier of a specific resource API based entity by which the service indicated by the indicator is to be shared or to which the service is to be exposed or provided. If the identifier is not included in the advertisement message, the service indicated by the indicator is shared by, exposed to or provided to all entities without restriction on entities.

The gateway or the AJ routing node may establish a session with the AllJoyn node (S1520). Accordingly, the gateway or the AJ routing node can have information about the service provided by AllJoyn node A.

The gateway or the AJ routing node may check the advertisement message to confirm whether there is a service to be shared by, exposed to or provided to the resource API based network or entities (S1530). If there is no service to be shared, exposed or provided, the procedure illustrated in FIG. 15 is ended.

If there is a service to be shared, exposed or provided, the AJ routing node may exchange information about the service to be shared, exposed or provided with an MN-AE or IPE 1522 (S1540). Such information exchange conforms to general data delivery formats. In general, information about the service and information about access and security of the information about the service can be exchanged.

The MN-AE or IPE may generate the exchanged information as resources (S1550). The resources generated in this step correspond to the resources shown in Tables 3 and 4. The resources are generated by an MN-CSE 1523 and the MN-CSE may transmit a response to resource generation to the MN-AE or IPE (S1560). Steps S1550 and S1560 are performed according to the request-response procedure described above with reference to FIG. 6.

Figure 16:
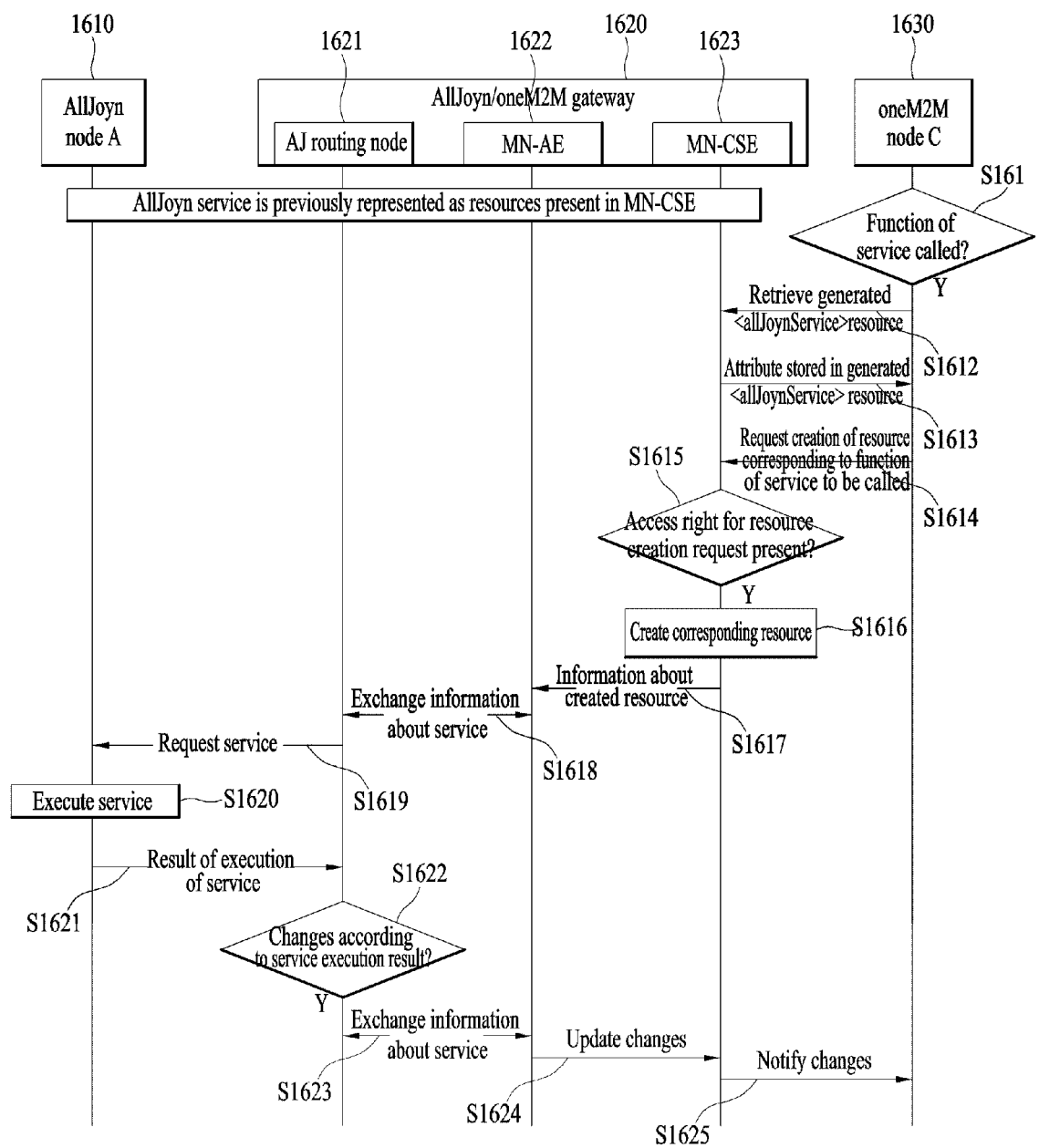

FIG. 16 illustrates an operation of the resource API based entity to call the service after the service of the RPC API based node is shared by, exposed to or provided to the resource API based entity, that is, after the resources related to the service are generated.

The resource API based entity (e.g., oneM2M node C 1630) may check whether a registered external RPC API based service needs to be called (S1611). This operation may be determined at the request of a user through an application connected to the resource API based entity. Here, the oneM2M node C may be the aforementioned AND, MN or IN. If the RPC API based service needs to be called, the resource API based entity can request retrieval of a resource (e.g., <allJoynService>) for the RPC API based service, generated in an MN-CSE 1623 (S1612).

The MN-CSE can respond to the resource API based entity by sending an attribute stored in the resource according to an access control policy (S1613). Through this operation, the configuration of the RPC API based service to which the oneM2M node C is connected can be known. For example, whether the RPC API based service operates and the function (i.e., method) and parameters (i.e., property) constituting the service can be checked. In addition, the MN-CSE may respond to or deny the request of the oneM2M node C according to a preset access control policy.

The resource API based entity sends a request for generation of a new <method> child resource corresponding to a function (i.e., method) defined in the RPC API based service to be called in <methods> resource corresponding to a child resource of <allJoynService> of the MN-CSE (S1614). In this generation process, the <methods> resource includes function arguments as an attribute. In addition, the resource API based entity may generate <subscription> resource in the explicitly generated <method> resource and notify an MN-AE or IEP 1622 of resource generation, or the MN-CSE may notify the MN-AE or IPE 1622 of resource generation when automatically generating a <method> resource. Furthermore, the resource API based entity may generate <subscription> resource for <properties> that is a child resource of <allJoynService> of the MN-CSE.

The MN-CSE may check access rights of the resource API based entity with respect to generation of the resource (S1615). The access rights will be described below with reference to FIG. 17.

When access to the resource is not permitted (i.e., when the oneM2M node C has no access rights for generation of the resource), the procedure of FIG. 16 is ended.

When access to the resource is permitted (i.e., when the oneM2M node C has access rights for generation of the resource), the MN-CSE may generate the child resource (S1616). Then, the MN-CSE may notify the MN-AE or IPE of information about the generated child resource (S1617).

The MN-AE or IPE may exchange information indicated by the generated child resource (i.e., the function of the service to be called) with an AJ routing node 1621 (S1618). The information may include the information about the generated child resource, for example, method and arguments.

The AJ routing node may send a request for the information about the generated child resource, that is, a method (service), to an RPC based node (e.g., AllJoyn node A 1610) (S1619). Then, the RPC based node may execute the method (S1620) and deliver a result of execution of the method to the AJ routing node (S1621).

Information such as properties may be changed according to the result of execution of the result. The AJ routing node may check whether the information is changed (S1622). The AJ routing node may exchange the result of execution of the method or the changed information with the MN-AE or IPE (S1623).

The MN-AE or IPE may update the changed information or the result of execution of the method to a <priorities> resource lower than an <allJoynService> resource of the MN-CSE (S1624).

When a <subscription> resource is generated for <properties>, the MN-CSE can notify the resource API based node of change of the information because notification for the resource has been subscribed (S1625).

Access restriction or control method of a resource API or RPC API based system or service will be described below.

Access restriction or control when the oneM2M system is used as an example of the resource API based system will be described.

In the oneM2M system, an access control policy for resources is represented as privileges. The privileges can be represented as entities that can access resources in a specific access mode. Specifically, a set of privileges can be represented as a group of privileges which can be represented as the sum of separate privileges.

The specific access mode is replaced by an operation specified in oneM2M, shown in the following table.

TABLE 5

| Name | Description |
| --- | --- |
| RETRIEVE | Privilege to retrieve the content of an addressed resource |
| CREATE | Privilege to create a child resource |
| UPDATE | Privilege to update the contents of an addressed resource |
| DELETE | Privilege to delete an addressed resource |
| DISCOVER | Privilege to discover the resource |
| NOTIFY | Privilege to receive a notification |

Additionally, SelfPrivilege refers to a privilege to change privileges specified above.

Privileges specified in the access control policy for resources may be values varied according to location, time window and IP address. The access control policy is connected to a resource through a method of generating an access control policy resource (<accessControlPolicy>) including access control information in the resource and then including link information (e.g., URI) about the access control policy resource in accessControlPolicyID that is an attribute of the resource.

The following table shows attributes of the <accessControlPolicy> resource.

TABLE 6

| Attribute Name of <accessControlPolicy> | Multi-plicity | RW/RO/WO | Description |
| --- | --- | --- | --- |
| resourceType (rT) | 1 | RO | Refer to Table 2 |
| parent ID (pID) | 1 | RO | Refer to Table 2 |
| expirationTime (eT) | 1 | RW | Refer to Table 2 |
| Labels (lBs) | 0 . . . 1 | RW | Refer to Table 2 |
| creationTime (cT) | 1 | RO | Refer to Table 2 |
| lastModifiedTime (lMT) | 1 | RO | Refer to Table 2 |
| announceTo | 1 | RW | Refer to Table 2 |
| announcedAttribute | 1 | RW | Refer to Table 2 |
| privileges (ps) | 1 | RW | The list of privileges defined by the <accessControlPolicy> resource. These privileges are applied to resources referencing the <accessControlPolicy> resource using the accessControlPolicyID attribute. |
| selfPrivileges (sP) | 1 | RW | Defines the list of privileges for the <accessControlPolicy> resource itself. |

The resource includes a common attribute value and further includes privileges and selfPrivileges.

In addition, the privileges and selfPrivileges include the following information.

TABLE 7

| Name | Description |
| --- | --- |
| originatorPrivileges | Refer to Table 8 |
| contexts | Refer to Table 9 |
| operationFlags | Refer to Table 5 |

The originatorPrivileges include information shown in the following table.

TABLE 8

| Name | Description |
| --- | --- |
| Domain | FQDN domain |
| originator identifier | CSE ID or AE ID which represents an originator identity |
| Token | Access token usually provided as query parameter |
| All | All originators |
| Role | A role name associated with the URL of a Service Subscription resource where such role is defined |

The contexts shown in Table 7 include information shown in the following table.

TABLE 9

| Name | Description |
| --- | --- |
| Context | Defines the context in which every privilege of the present access control policy resource applies, e.g. time windows, location and IP address. |

The operationFlags shown in Table 7 can define representations of the operations listed in Table 5.

Figure 17:
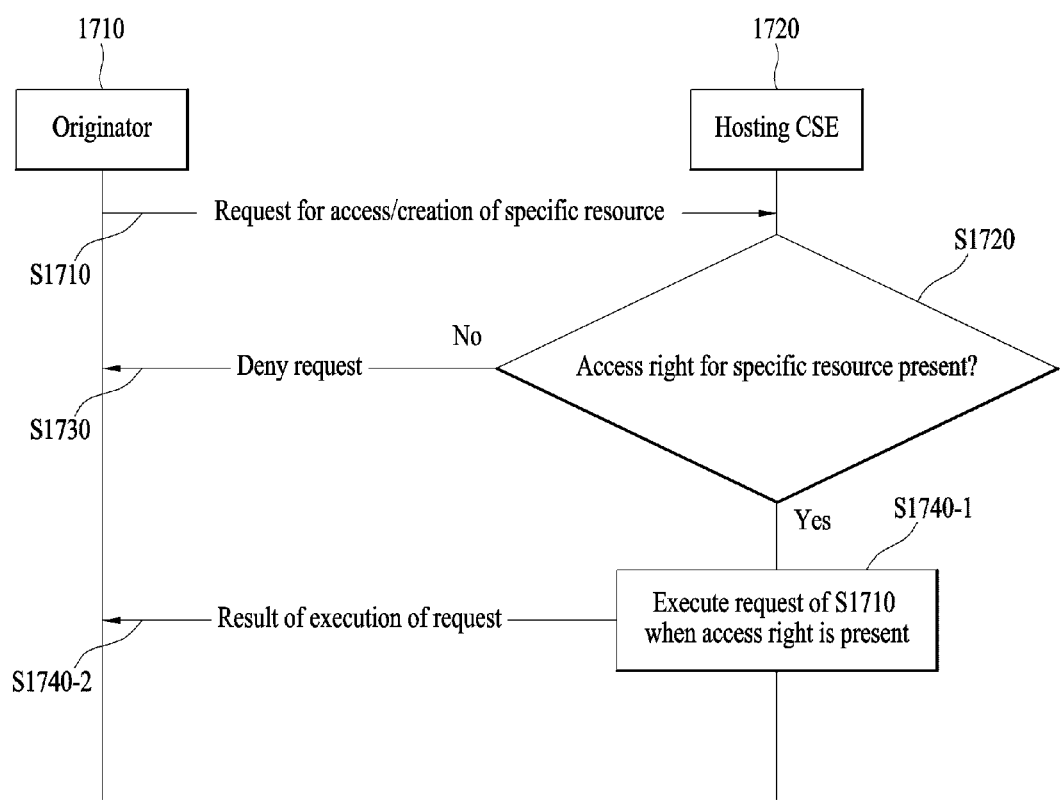
FIG. 17 illustrates a procedure for checking an access right for a specific resource.

An access control procedure based on the aforementioned resource access control policy resource (<accessControlPlolicy>) is illustrated in FIG. 17.

An originator 1710 may send, to a hosting CSE 1720 (i.e., an entity having a resource to be accessed), a request for access/generation of a specific instantiated or stored resource (S1710). Upon reception of the request, the hosting CSE may check attribute "privileges" defined in the <accessControlPolicy> resource connected to the specific resource in order to check access privileges for the specific resource (S1720). More specifically, the hosting CSE reads "originatorPrivileges", "contexts" and "operationFlags" specified in the attribute "privileges" to check whether the request corresponds to the specified values.

If the request does not correspond to "privileges", the hosting CSE may send a request denial message to the originator (S1730). If the request corresponds to "privileges", the originator is permitted to access the specific resource and thus the hosting CSE may execute the request (S1740-1). Then, the hosting CSE may send a result of execution to the originator (S1740-2).

Access restrictions of the resource API based system have been described. Access restrictions of the RPC API based system need to be defined for more specific information. For example, entities, services and functions that are proposed in the services and can be used by the entities need to be defined.

In the present invention, InterfacePrivileges can be specifically described in "privilege" when <accessControlPolicy> is connected to <allJoynServices> resource.

interfacePrivileges: when <allJoynServices> resource type is connected, which one of functions, methods and signals specified ("interfaceInfo" attribute) in the AllJoyn service (interface), can be used is specified.

For example, when it is assumed that method_a, method_b and method_c have been registered as methods provided by the AllJoyn service in "interfaceInfo" attribute, an originator (i.e., requester) and a method that can be used by the originator from among the defined methods are specified in the interfacePrivileges.

For example, if oneM2M node A can use method_a, CREATE for generating <method_a> can be permitted.

Figure 18:
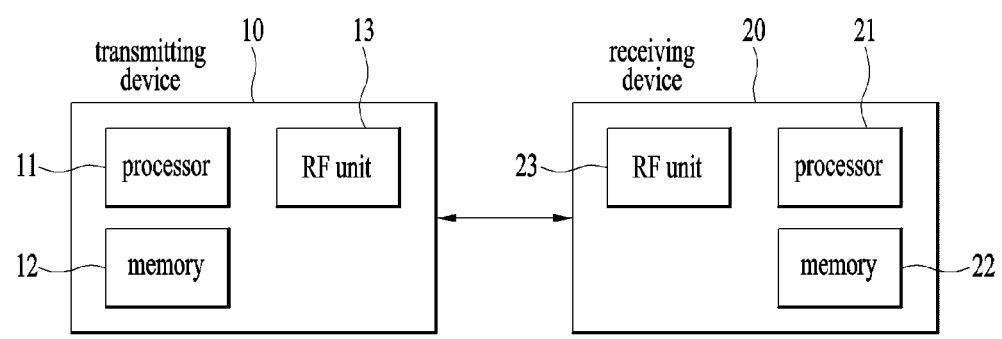
FIG. 18 is a block diagram of an apparatus for implementing embodiments of the present invention.

FIG. 18 is a block diagram of a transmitting device 10 and a receiving device 20 configured to implement exemplary embodiments of the present invention. Referring to FIG. 18, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

The invention claimed is:

1. A method for processing request messages between heterogeneous systems in a wireless communication system, the method being performed by a gateway device and comprising:
receiving an advertisement message about a service of a first node from the first node belonging to a first system;
when the advertisement message includes an indicator indicating that the service is shared with a second system, generating resources which represent the shared service and a resource for access control for the generated resources;
receiving a request message for retrieving information on resources corresponding to at least one service shared with the second system, which have been generated in the gateway device from a second node of the second system;
transmitting the information on the resources corresponding to the at least one service to the second node when the second node has an access right for the retrieving information on the resources corresponding to the at least one service;
receiving, from the second node, a request message for generating a resource corresponding to a service to be called selected from the information on the resources corresponding to the at least one service, as a child resource of the generated resources;
checking an access right for generation of the child resource; and
generating the child resource when the second node has an access right for generation of the child resource.

2. The method according to claim 1, wherein the advertisement message further includes an identifier of a node of the second system sharing the shared service.

3. The method according to claim 1, wherein a service interwork for all nodes of the second system when the advertisement message does not include the identifier of the node of the second system sharing the shared service.

4. The method according to claim 1, further comprising calling the first node for execution of a service corresponding to the child resource when the child resource is generated.

5. The method according to claim 4, further comprising receiving a result of processing of the called service from the first node and updating the result to a specific child resource of the generated resources.

6. The method according to claim 1, further comprising receiving a request for generating a resource for notification of a result of processing of the selected service to be called.

7. The method according to claim 1, wherein the first system uses a first interface type and the second system uses a second interface type.

8. The method according to claim 1, wherein the first interface type is a remote procedure call (RPC) application program interface (API) and the second interface type is a resource API.

9. A machine-to-machine (M2M) device configured to process request messages in a wireless communication system, the M2M device comprising:
a transceiver; and
a processor configured to:
control the transceiver to receive an advertisement message about a service of a first node from the first node belonging to a first system,
when the advertisement message includes an indicator indicating that the service is shared with a second system, generate resources which represent the shared service and a resource for access control for the generated resources,
control the transceiver to receive a request message for retrieving information on resources corresponding to at least one service shared with the second system, which have been generated in the gateway device from a second node of the second system,
control the transceiver to transmit the information on the resources corresponding to the at least one service to the second node when the second node has an access right for the retrieving information on the resources corresponding to the at least one service,
control the transceiver to receive, from the second node, a request message for generating a resource corresponding to a service to be called selected from the information on the resources corresponding to the at least one service, as a child resource of the generated resources,
check an access right for generation of the child resource, and
generate the child resource when the second node has an access right for generation of the child resource.

10. The M2M device according to claim 9, wherein the advertisement message further includes an identifier of a node of the second system sharing the shared service.

11. The M2M device according to claim 9, wherein a service interwork for all nodes of the second system when the advertisement message does not include the identifier of the node of the second system sharing the shared service.

12. The M2M device according to claim 9, wherein the processor is configured to call the first node for execution of a service corresponding to the child resource when the child resource is generated.

13. The M2M device according to claim 12, wherein the processor is configured to receive a result of processing of the called service from the first node and to update the result to a specific child resource of the generated resources.

14. The M2M device according to claim 9, wherein the processor is configured to receive a request for generating a resource for notification of a result of processing of the selected service to be called.

15. The M2M device according to claim 9, wherein the first system uses a first interface type and the second system uses a second interface type.

16. The M2M device according to claim 9, wherein the first interface type is a remote procedure call (RPC) application program interface (API) and the second interface type is a resource API.

* * * * *